Dec. 19, 1944.                L. BÖLKOW                 2,365,382
                             AIRCRAFT PLANE
                 Filed July 30, 1941        3 Sheets-Sheet 1

Inventor:
L. Bölkow
By: Glascock Downing Seebold
Attys.

Dec. 19, 1944. L. BÖLKOW 2,365,382
AIRCRAFT PLANE
Filed July 30, 1941 3 Sheets-Sheet 2

Inventor:
L. Bölkow
By: Glascock Downing Seebel
Attys.

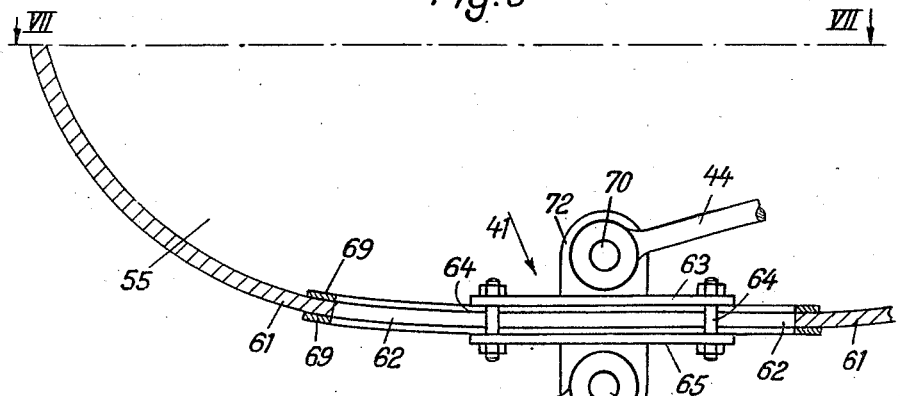
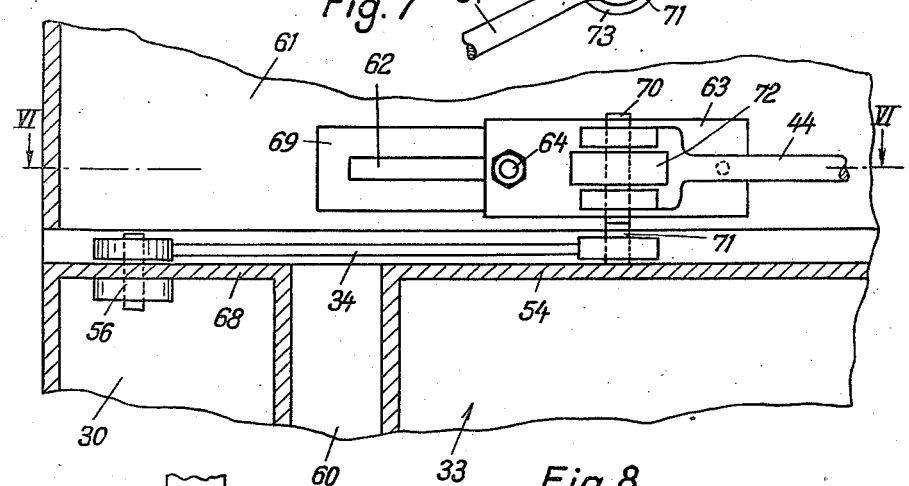
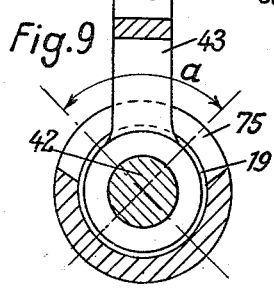
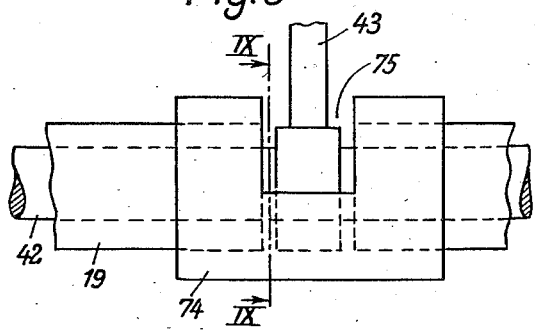

Patented Dec. 19, 1944

2,365,382

UNITED STATES PATENT OFFICE 2,365,382

AIRCRAFT PLANE

Ludwig Bölkow, Augsburg, Germany; vested in the Alien Property Custodian

Application July 30, 1941, Serial No. 404,695
In Germany August 2, 1939

13 Claims. (Cl. 244—42)

This invention relates to an aircraft plane with means for variation of the characteristics of the wing profile.

In one known wing construction of this type adjustable wing noses are provided for increasing the camber of the profile and the lift. In another wing construction a stationary or movable auxiliary front wing is provided in front of the aircraft plane which is fixedly connected with the fuselage, forming a slot between the auxiliary front wing and the main wing, whereby tearing of the boundary layer is retarded.

It is an important object of the present invention to provide a wing construction permitting sensitive adjustment and variation of the profile characteristics within a wide range.

With this and further objects in view, which will be hereinafter set forth, according to the invention the wing or aircraft plane is provided with an auxiliary front wing and a movable wing nose which permits adjustment of the camber of the profile. The auxiliary front wing may be fixedly connected with the main wing and the parts may be so arranged that in one end position of the movable wing portion the same together with the auxiliary front wing and the fixed main wing forms a substantially closed, unitary profile, while on movement of said wing portion towards its opposite end position a slot is formed between said wing portion and the front wing.

Generally, still more favourable conditions are obtainable by providing the front wing to participate in the motion of the movable wing nose or leading edge. In this case, a mechanism may be provided for automatically advancing the front wing for formation of a slot as the movable leading edge is swung towards deeper camber. The adaptability can be increased by constructing the adjusting mechanism for the front wing so as to permit adjustment of the front wing relatively to the hinged leading edge independently of the adjustment of said edge.

The above mentioned steps have a particularly favourable effect in connection with wings having a lifting flap at or near their trailing edge, as known per se.

The air or gas current resulting in the slot between the auxiliary front wing and the hinged leading edge may be supported by an additional current discharged from one or more blow-out slots in the front wing.

The characteristics of the wing profile may be further improved by the provision of slots in the vicinity of the lifting flap and of the aileron, as known per se.

The invention will be better understood by reference to the following detailed description in connection with the accompanying drawings showing by way of example and purely schematically some embodiments of the invention, viz:

Fig. 6 is a section on line VI—VI of Fig. 7, showing a detail of Fig. 5.

Fig. 7 is a section on line VII—VII of Fig. 6.

Fig. 8 is an elevation, showing another detail of Fig. 5.

Fig. 9 is a section on line IX—IX of Fig. 8.

Similar characters of reference denote similar parts in the different figures.

Figure 1:
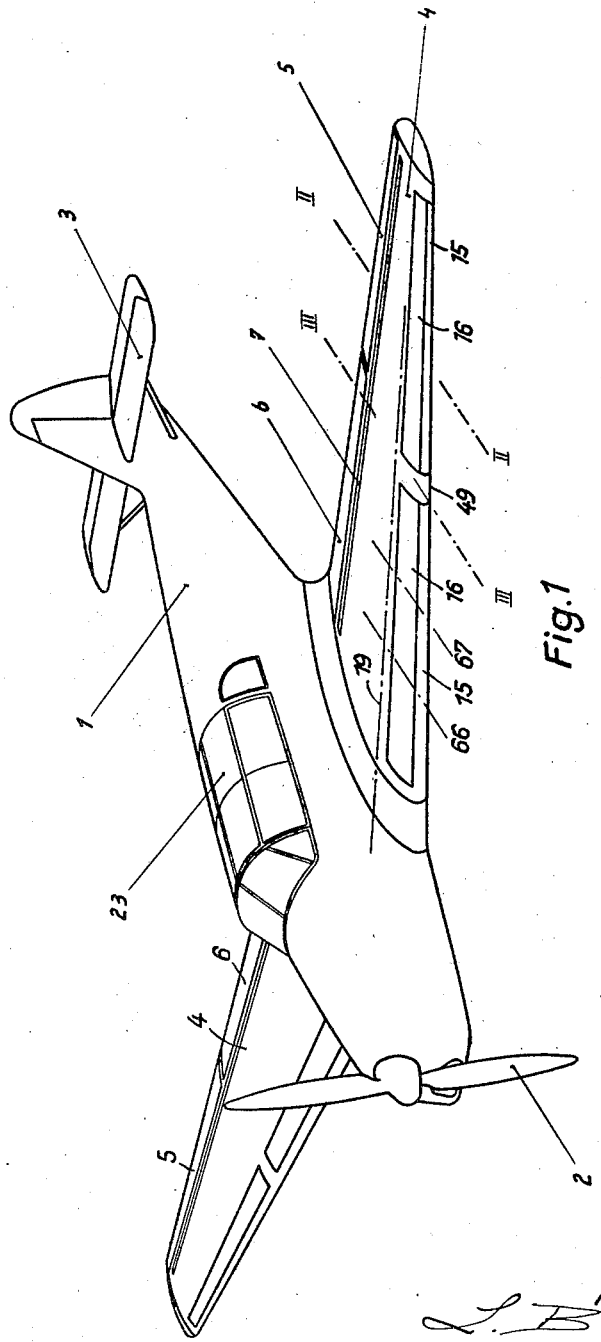
Fig. 1 is a perspective view of an airplane including supporting planes having the invention applied thereto.

Referring now to the drawings in greater detail, first to Fig. 1, it will be noted that the fuselage 1 of the aircraft includes a cockpit 23, a propeller 2 and tail surfaces 3. Main wings 4 are fixedly connected on both sides of the fuselage and at their trailing edges are fitted with outer ailerons 5 and inner lifting flaps 6. A continuous slot 7 extends from end to end of each wing adjacent to the aileron and the lifting flap.

Figure 2:
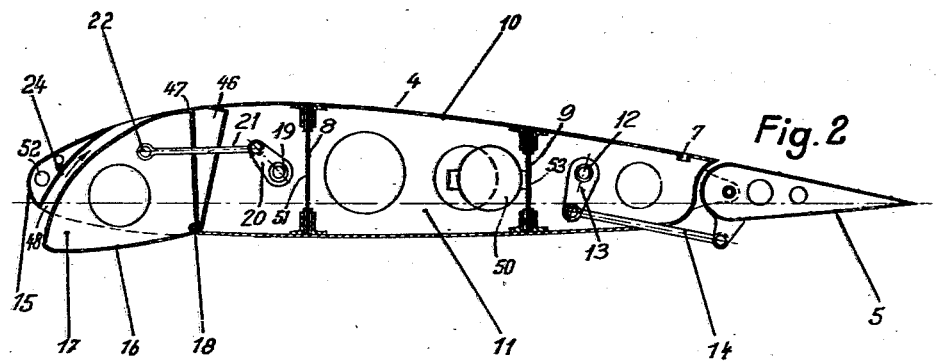
Fig. 2 is a cross sectional view of the wing, on line II—II of Fig. 1, on a larger scale.
Figure 3:
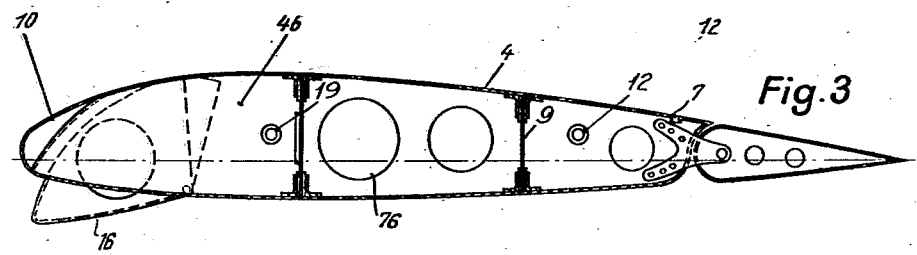
Fig. 3 is a cross sectional view on line III—III of Fig. 1, on a larger scale.

The construction of the wings will be better seen from Figs. 2 and 3, showing two spars 8 and 9 carrying the covering 10 which in transverse direction is supported by ribs 11 arranged at intervals along the wing and serving, moreover, to support a shaft 12 for adjustment of the ailerons 5 and the lifting flaps 6 through arms 13 fixedly mounted on shaft 12, and rods 14 co-operating therewith.

According to this invention, the forward portion of wing 4 forms a self-contained unit, making up a so-called front wing 15 which in the embodiment shown in Figs. 2 and 3 is rigidly connected to the main wing 4 by means of continuous ribs 46 extending to the extreme leading edge.

Provided between the front wing 15 and the main wing 4 are movable wing noses or portions 16. As shown in Fig. 1, two portions 16 are provided for each wing 4. The portions 16 are suitably constructed as torsion proof tubes which are stiffened by ribs 17 and hinged about a joint 18 at the lower side of main wing 4 for downward swinging. In the upper portion of portion 16 its upper edge 47 comes to lie under the planking 10 of the main wing, the contours of the profile portion of the part 16 adjacent to the edge 47 being shaped to conform to a circle about joint 18 in the region covered by the planking 10 and the remainder of the profile of part 16 being shaped to form a closed unitary profile together with the front wing and the main wing 4 in the upper position of wing nose 16. A shaft 19 supported in the ribs 11 of main wing 4 serves to adjust the hinged leading edge or wing flap 16 through levers 20 on shaft 19 and connecting rods 21 jointed to the ribs 17 of flaps 16 at 22. The shaft 19 extends into the cockpit 23, as indicated by the dot and dash lines in Fig. 1, for operation by any suitable driving mechanism, for example, a worm and worm wheel system, not shown.

If the wing noses 16 are swung downwards, slots 48 are formed between these noses and the front wings 15, whereby in flight an air current is produced which passes upwards through these slots 48.

The stationary front wing 15 on its walls facing the hinged flaps 16 is fitted with blow-out slots 24 adapted for the discharge of compressed air or exhaust gas which may be directed into the front wing 15 from the fixed main portion of wing 4 through the channel formed by the hollow bridge portion 49, Fig. 1.

By blowing air or gas through the slots 24, the current in the slots 48 between the front wings and the hinged flaps 16 is promoted and the effect of the front wing 15 is enhanced. If desired, the air discharged from slots 24 may be sucked on through slots 7 in the aft position of the wing, for instance, by means of a pump 50, shown in Fig. 2 as shifting air from the space to the right of spar 9 into the space to the left thereof, through aperture 53 in the spar 9. A centrifugal pump or any other suitable type of pump may be used for this purpose; or, an ejector operated by the exhaust gas of the engine may be used. The air then passes through apertures 51 in spar 8, channel 49, and apertures 52 in rib 46 into the front wing 15, for discharge from slots 24. If desired, the exhaust gas may be discharged directly through the slots 24 of the front wing, while the sucking on through slot 7 may be effected by means of an additional blower, for instance, the engine blower, delivering the suction air to the engine.

Figure 4:
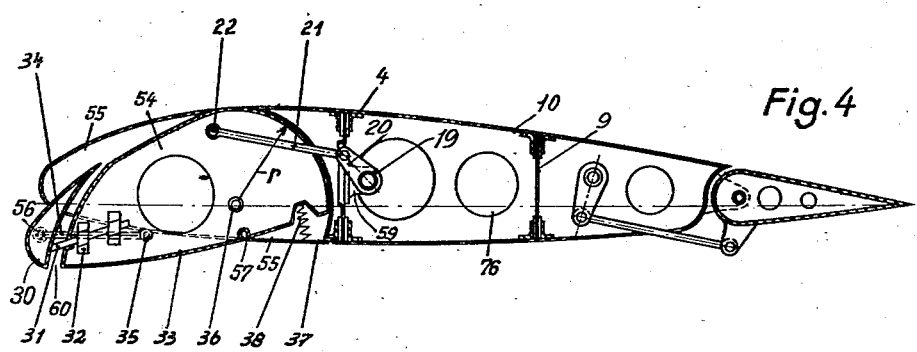
Fig. 4 is a cross sectional view through a modified form of a wing on a line corresponding to line II—II of Fig. 1, on a larger scale.

Referring now to the embodiment shown in Fig. 4, it will be noted that the auxiliary front wing 30 in this case is not rigidly connected to the main wing 4, but movably mounted by connection to the wing portion which is referred to as the hinged wing nose and in Fig. 4 is designated with 33. In the embodiment shown in Fig. 4, rods 31 are fixedly mounted on front wing 30 and slidable in guide members 32 on intermediate partition walls or ribs 54 of the wing portion 33 which in turn is hinged to ribs 55 of the main wing 4 at 36. Moreover, a control rod 34 is jointed at 56 to front wing 30 and with its opposite end is jointed to the main wing 4, at 35, whereby the front wing 30 is automatically spread off from flap 33, as will be hereinafter described.

The adjacent surfaces of flap 33 and main wing 4 are shaped to conform to a cylinder whose axis is at the fulcrum 36 of flap 33, as indicated by radius $r$. Since the fulcrum 36 in this case unlike Figs. 2 and 3 is not located at the rear edge of the hinged portion 33, an angular recess is produced between the portions 33 and 4 as the leading edge of flap 33 is swung downwards. In order to prevent the air flow from being disturbed by this recess, a covering flap 37 is hinged to flap 33 at 57 to swing about an axis which is parallel to the axis of joint 36, under action of an upward pull exerted by a helical spring 38. By way of alternative, flap 37 may be springy in itself.

A shaft 19 mounted in bearing brackets 59 on spar 8 and adapted to be operated from the cockpit, as described with reference to the preceding figures, serves for moving flap 33 through arms 20 on shaft 19 and connecting rods 21 jointed at 22 to ribs 54 of wing flap 33. It will be obvious that on downward swinging of flap 33, the auxiliary front wing 30 will be spread from flap 33, by action of control rod 34, forming between front wing 30 and wing flap 33 a slot 60. On return of flap 33 into the straight position for high speed flight the auxiliary front wing 30 is withdrawn by rod 34 to contact flap 33, thus forming a unitary, self-enclosed profile with parts 33 and 4.

Figure 5:
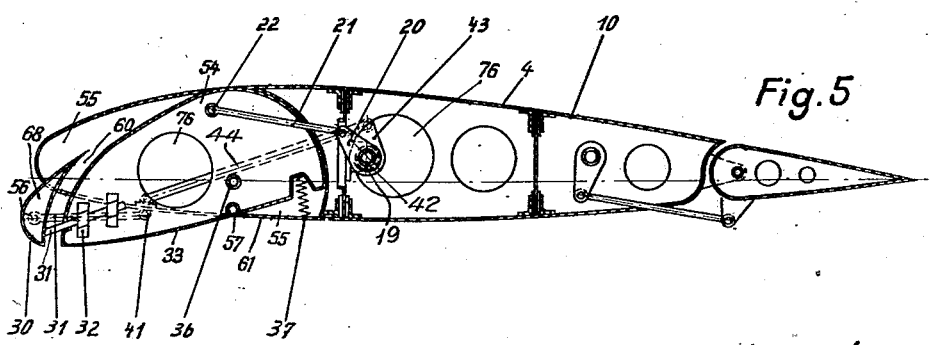
Fig. 5 is a cross sectional view through another modification of a wing on a line corresponding to line II—II of Fig. 1, on a larger scale.

Referring now to the embodiment illustrated in Figs. 5 to 9, it will be noted that the joint 41 connecting control rod 34 for front wing 30 with the main wing 4 in this case is not fixedly secured to wing 4, like joint 35 in Fig. 4, but is mounted for sliding along the lower contour of the profile, as best seen from Figs. 6 and 7, in which 61 is the covering of wing 4, 62 is a slot therein and 63 is a slide member which by two spaced screws 64 is connected with a second slide member 65, parts 63, 64, 65 making up together the joint 41 of Fig. 5, to eyelets 72 and 73 of which the control rods 44 and 34 are jointed, by pivot pins 70 and 71, respectively. It should be noted in this connection that the control parts 20, 21, 22 and 32, 31 may be mounted in the middle region of flap 33 and front wing 30 in two or more geometrical planes indicated by dot and dash lines at 66 and 67 in Fig. 1, while a pair of rods 34 is jointed at 56 to the opposite end walls 68 of front wing 30, as best shown in Fig. 7. The slot 60 between wing nose 33 and front wing 30 is also shown in Fig. 7. It will be understood that the mechanism shown in Figs. 6 and 7 is illustrated purely schematically since the practical design is obvious from these figures to one skilled in the art. Metal linings 69 or reinforcing plates may be provided on both sides of the planking 61 within the moving range of joint 41. The control rods 44 are operated from levers 43 on a shaft 42 which is coaxially mounted within shaft 19, as shown in Figs. 8 and 9. In order to permit independent operation of the shafts 19 and 42 from the cockpit, the outer shaft 19 is interrupted at the points where levers 43 are mounted on shaft 42, the driving connection between the adjacent portions of shaft 19 being established, for instance, by a coupling sleeve 74 which is recessed at 75 as shown for permitting unhampered relative motion of the shafts 19 and 42 through a maximum angle $a$.

By forward or rearward shifting of joint 41 it is possible to advance and withdraw the front wing 30 independently of the motions of wing flap 33. It follows that front wing 30 can be spaced from flap 33 even if the latter is in its upper or high spread position for slight camber. Moreover, this arrangement permits front wing 30 to be held in engagement with flap 33 also in the downwardly swung position of the latter for deep camber. In other words, any desired width of slot 60 between front wing 30 and flap 33 can be adjusted with any position of flap 33, thus permitting a sensitive, continuous variation of the characteristics of the profile. Reference numerals 76 denote lightening holes in the ribs.

The method and apparatus of the present invention have been described in detail with reference to specific embodiments. It is to be understood, however, that the invention is not limited by such specific reference but is broader in scope and capable of other embodiments than those specifically described and illustrated in the drawings.

I claim:

1. An aircraft plane, comprising in combination a main plane, a wing nose pivoted to said main plane, an auxiliary front wing movably connected to the front face of said wing nose, means for swinging said wing nose for varying the camber of the plane, and means for selectively spreading said front wing from the front face of said wing nose to form a slot between said front wing and said wing nose.

2. An aircraft plane, comprising in combination a main plane, a wing nose pivoted to said main plane, an auxiliary front wing movably connected to the front face of said wing nose, means for swinging said wing nose for varying the camber of the plane, and means for selectively spreading said front wing from the front face of said wing nose to form a slot between said front wing and said wing nose in dependence of the position of the wing nose.

3. An aircraft plane, comprising in combination a main plane, a wing nose pivoted to said main plane, an auxiliary front wing movably connected to the front face of said wing nose, means for swinging said wing nose for varying the camber of the plane, and means including control rods jointed at their opposite ends to the main plane and to the front wing, respectively, for selectively spreading said front wing from the front face of said wing nose to form a slot between said front wing and said wing nose.

4. An aircraft plane, comprising in combination a main plane, a wing nose pivoted to said main plane, an auxiliary front wing movably connected to the front face of said wing nose, means for swinging said wing nose for varying the camber of the plane, and means including control rods jointed at their opposite ends to the main plane and to the front wing, respectively, for selectively spreading said front wing from the front face of said wing nose to form a slot between said front wing and said wing nose, independently of the position of the wing nose.

5. An aircraft plane, comprising in combination a main plane, a wing nose pivoted to said main plane, an auxiliary front wing movably connected to the front face of said wing nose, means for swinging said wing nose for varying the camber of the plane, control rods jointed at their opposite ends to the front wing and to slidable joints of the main wing, respectively, and control means adapted to shift said slidable joints, for moving said front wing with respect to said wing nose independently of the position of the wing nose.

6. An aircraft plane, comprising in combination a main plane, a wing nose hinged to said main plane for varying the camber of the plane, an auxiliary front wing arranged before said wing nose, means for moving said wing nose and said front wing relatively to each other to form a slot between said wing nose and said front wing, and at least one lifting flap in the region of the trailing edge of the plane.

7. An aircraft plane, comprising in combination a main plane, a wing nose hinged to said main plane for varying the camber of the plane, an auxiliary front wing arranged before said wing nose, means for moving said wing nose and said front wing relatively to each other to form a slot between said wing nose and said front wing, said front wing being provided on its side facing the wing nose with a slot, and means for blowing out compressed gas from said slot.

8. An aircraft plane, comprising in combination, a main plane, a wing nose hinged to said main plane for varying the camber of the plane, an auxiliary front wing arranged before said wing nose, means for moving said wing nose and said front wing relatively to each other to form a slot between said wing nose and said front wing, at least one lifting flap and one aileron in the region of the trailing edge of the plane, at least one slot in the main plane, near said lifting flap and said aileron, and means for causing an air flow through said slot in the main plane.

9. In an aircraft wing construction, a main wing, a wing nose positioned along the leading edge of said main wing, a front wing positioned along the leading edge of said wing nose, said wings and said wing nose being in nested relationship and forming a wing assembly of normal profile, and means mechanically associating said wings and said wing nose in definite relation with respect to each other including, a pivotal means adjacent the lower trailing edge of said wing nose pivotally connecting said wing nose to said main wing, a crank arm rockably mounted on the main wing, and a link pivoted at one end to the upper portion of said wing nose and at the other end to the free end of said crank arm, the point of connection between said link and the upper portion of said wing nose being located intermediate the opposite ends of the wing nose, said wings and the said wing nose being mechanically related so that rocking of said crank arm swings said wing nose about said pivotal means, thereby to change the camber of the front edge of the wing assembly and also to produce a slot between the leading edge of said wing nose and said front wing.

10. A wing construction as described in claim 9 wherein the leading edge of said main wing has a concave arcuate surface and said wing nose has an extension at its trailing edge with a trailing convex arcuate surface interfitting with said concave arcuate surface during swing movement of the wing nose about said pivotal means, and a flap extending normal to the lower surface of the main wing and pivoted to the lower surface of said wing nose along a line which is substantially below the axis of said pivotal means, whereby swinging movement of said wing nose produces a recess which is covered by said flap.

11. A wing construction as described in claim 9 wherein said front wing is mounted upon a plurality of slide rods which are carried by said wing nose, and wherein the slot between said wing nose and the said front wing is produced by moving said front wing forward with respect to said wing nose.

12. A wing construction as described in claim 9 wherein said crank arm is mounted on a hollow shaft having therein a central-control shaft, and means operative by rocking of said control shaft to control the movement of said front wing with respect to said wing nose.

13. A wing construction as described in claim 9 wherein said front wing is slideably mounted upon the leading edge of said wing nose and wherein a linkage assembly connects the lower portion of said front wing with the lower portion of said wing nose, and adjusting means pivotally connecting the linkage assembly to said main wing comprising a pair of plates having pivots thereon and connected by a pair of bolts extending through an open slot thereby to form a sliding mounted means.

LUDWIG BÖLKOW.